United States Patent [19]

Harrison

[11] Patent Number: 4,790,414
[45] Date of Patent: Dec. 13, 1988

[54] RAILWAY DECELERATION CONTROLLER FOR BRAKE

[75] Inventor: Anthony W. Harrison, Selly Oak, England

[73] Assignee: Lucas Industries public limited company, Birmingham, England

[21] Appl. No.: 20,349

[22] Filed: Mar. 2, 1987

[30] Foreign Application Priority Data

Mar. 7, 1986 [GB] United Kingdom ............... 8605716

[51] Int. Cl.⁴ ............................................. B60T 11/10
[52] U.S. Cl. ............................. 188/152; 137/505.14; 137/505.18; 137/625.68; 188/382; 303/1; 303/54; 303/84.1; 303/86
[58] Field of Search .............. 137/505.14, 505.18, 137/625.68, 625.69; 303/61, 22, 54, 40, 84, 1, 66, 86, 59–60; 188/349, 195, 347, 348, 351, 152, 382

[56] References Cited

U.S. PATENT DOCUMENTS

| | | | |
|---|---|---|---|
| 3,087,705 | 4/1963 | Hamilton | 137/505.18 X |
| 3,402,566 | 9/1968 | Leimbach | 137/505.18 X |
| 3,467,440 | 9/1969 | Strien | 137/505.14 X |
| 3,504,698 | 4/1970 | Frill | 137/505.14 X |
| 3,515,441 | 6/1970 | Stein | 303/54 |
| 3,583,422 | 6/1971 | Dach et al. | 137/505.14 X |
| 3,911,947 | 10/1975 | Boxall | 137/505.14 |
| 3,926,208 | 12/1975 | Hoffman | 137/505.18 X |
| 4,236,763 | 12/1980 | Resch | 303/54 |
| 4,415,001 | 11/1983 | Kent | 137/505.18 X |

Primary Examiner—Douglas C. Butler
Attorney, Agent, or Firm—Scrivener and Clarke

[57] ABSTRACT

A controller for controlling the increase in fluid brake pressure as a brake is applied irrespective of how rapidly the operator applies the brakes. The controller includes a valve between inlet and outlet ports in a valve body, the valve having opposing faces subjected respectively to pressure at the outlet and pressure in a volume chamber between the valve and a spring loaded piston and connected to the outlet through a restricted orifice. The valve seeks an equilibrium position wherein the rate of rise in pressure at the outlet is controlled and the deceleration of the vehicle is controlled even when the operator applies the brakes at an excessive rate.

3 Claims, 3 Drawing Sheets

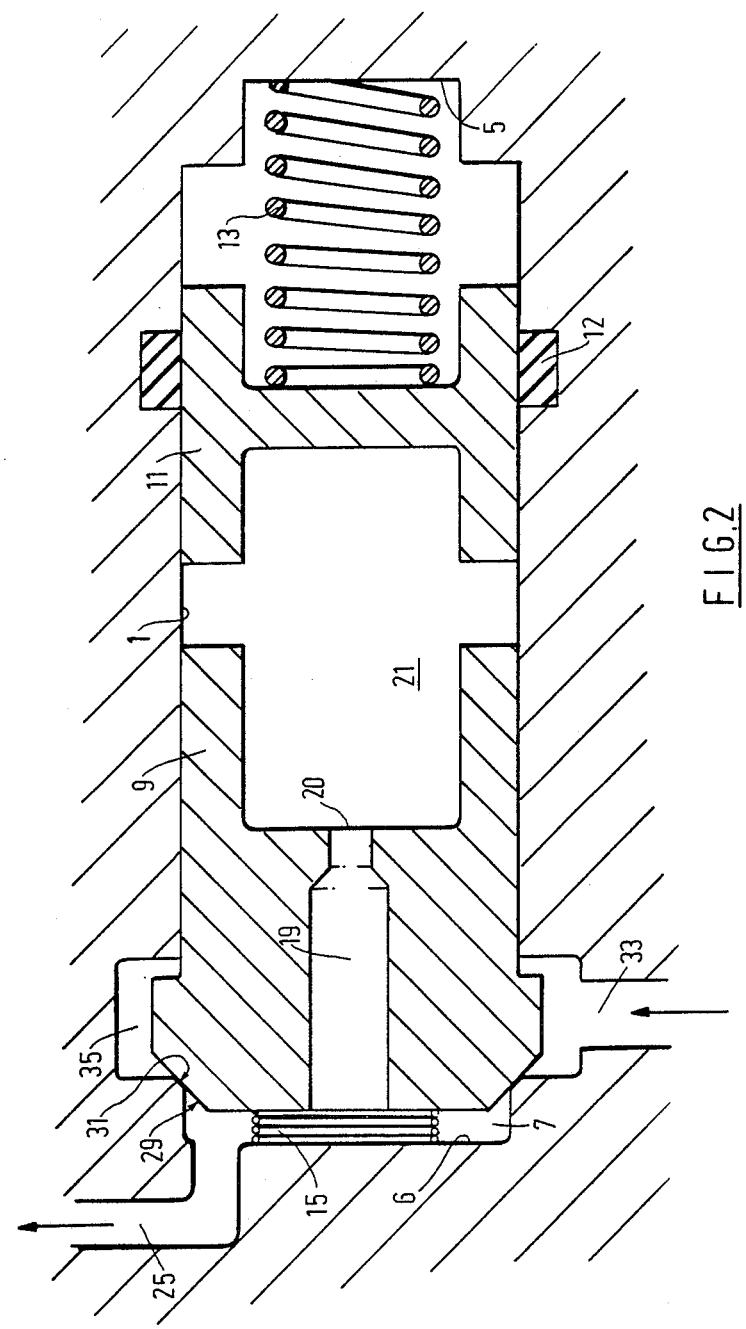

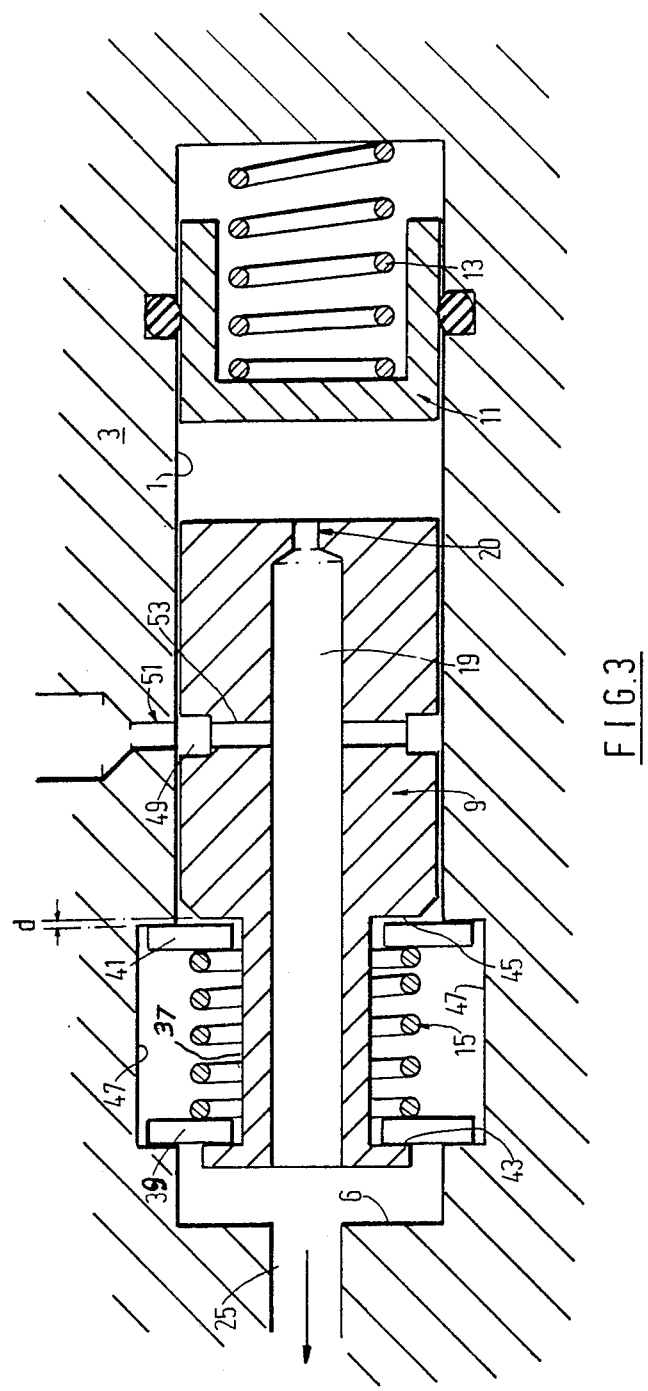

RAILWAY DECELERATION CONTROLLER FOR BRAKE

DESCRIPTION

The present invention relates to a deceleration controller.

In particular the present invention relates to a deceleration controller for use in controlling the increase in hydraulic or pneumatic brake pressure as a brake is applied. Such a deceleration controller is especially important in railway vehicles, it being a requirement for most railway vehicles that the rate of change of deceleration, i.e. the so-called 'jerk rate', during braking, falls within a specified range. Hydraulic brake systems tend to respond too quickly to produce a jerk rate which is acceptable for passenger comfort. In contrast a very low jerk rate results in the brakes lacking the necessary responsiveness.

The aim of the present invention is to provide a deceleration controller for use in controlling the hydraulic or pneumatic pressure applied to a brake, to thus provide a jerk rate within a required range.

According to the present invention there is provided a deceleration controller comprising a valve member which is axially movable in a chamber in a body between an open position and a closed position to control fluid flow between an inlet and an outlet, a passage connecting one part of the chamber which includes the outlet, with another part of the chamber, defining a volume chamber located between said valve member and a spring loaded piston.

In one embodiment of the present invention, designed for hydraulically or pneumatically applied brakes, the valve member and piston are axially slidably located in a chamber in the form of a cylindrical bore which extends through the body, and is of substantially uniform diameter. The cylindrical bore is closed at both axial ends and a main spring is located between one closed end and said piston, the piston being sealed with the wall of the bore. Between the valve member and said piston a light spring, i.e. a spring of negligible spring rate, is located, the springs biassing the valve member in its rest condition against the other closed end of the cylindrical bore. The valve member has a passage incorporating a restrictor orifice, extending axially therethrough and an annular groove in its periphery, the inlet from a pressurised supply of brake fluid opening into this groove. Alternatively, a passage extending through the body around the valve member and likewise incorporating a restrictor orifice, may replace the passage through the valve member. Part of the cylindrical bore including said other closed end is radially enlarged to form a pressure chamber which connects with the pressure fluid outlet leading to the brakes. The shoulder formed between the enlarged diameter region and the uniform diameter region of the bore provides a valve seat in the form of an annular knife edge against which part of the valve member can be engaged to disconnect said inlet from said outlet.

In operation, when the brakes are applied, the fluid pressure in the inlet increases and initially the valve member remains in its rest position against upstanding projections on said other closed end of the bore, whilst fluid flows through the controller to rapidly take up the brake pad clearance. The fluid pressure in the controller will not rise significantly whilst brake clearance is being taken up and so there will be no appreciable movement of the piston and no significant flow through the passage in the valve member. However, when the brake is engaged and the clamp load builds up, the pressure in said pressure chamber will tend to rise rapidly. This pressure build-up acts on the piston via said passage and the piston moves to compress the main spring and attain an equilibrium position. The resulting increase in volume of the chamber between the piston and valve member causes a rapid fluid flow through the passage in the valve member, resulting in a pressure drop across the valve member. The valve member thus moves towards the piston closing the controller and reducing the rise in pressure in said pressure chamber. A state of balance will then exist where the fluid flow through the passage is just sufficient to create a pressure drop across the valve member which corresponds to the load in the light spring. The resulting movements of the valve member will thus control the pressure rise in the pressure chamber and in the said outlet. As the static fluid pressure in the said outlet is proportional to deceleration, and the controller controls the rate of the rise in pressure in the outlet, when a step rise in pressure is applied at the inlet so the controller controls deceleration irrespective of how rapidly the operator applies the brakes. Thus, the desired jerk rate can be achieved, mathematical calculation confirming that it is solely the physical design characteristics of the controller which determine the deceleration, i.e. the rate of increase in outlet pressure.

In another embodiment of the present invention, designed for spring applied, hydraulically or pneumatically released brakes, the operation of the valve member is reversed as compared to the above described embodiment. The balanced condition now occurs when pressure fluid is flowing out of the chamber between the piston and valve member, through the passage and into the pressure chamber, as a result of the falling pressure in the pressure chamber; a light spring being located between the valve member and said other closed end of the bore to ensure that the controller is open in the rest condition.

One of each of the above embodiments could be connected in series to provide for the control of the rate of release of a brake as well as the control of the rate of application; this being desirable to provide for smoother operation in the event of spasmodic or cadence braking. Alternatively two of either of the above embodiments could be connected in parallel with suitably positioned non-return valves, to produce the desired effect.

Control of the rate of release can, however, be additionally obtained by a still further embodiment of the present invention, wherein the cylindrical valve member has a radial passage which connects with the passage extending axially right through the valve member. The valve member is spring biassed in the bore in both axial directions, towards a centralised position wherein the radial passage is aligned with a port in the bore wall, which port is connected to a source of pressurised fluid. By virtue of this construction fluid flow in either direction produces a pressure drop across the valve member such that the valve member moves in an appropriate direction and thus varies the overlap between the radial passage and the port. The pressure drop across the valve member is balanced by the spring bias and thus the rate of fluid flow movement in either direction is controlled. As a result, the rate of brake application and the rate of brake release is controlled, and smoother operation is attained The present invention will now be further described, by way of example, with reference to the accompanying drawings, in which:

FIG. 2 is a schematic axial cross-sectional view through another embodiment of the present invention, and FIG. 3 is a schematic axial cross-sectional view through a still further embodiment of the present invention.

Figure 1:
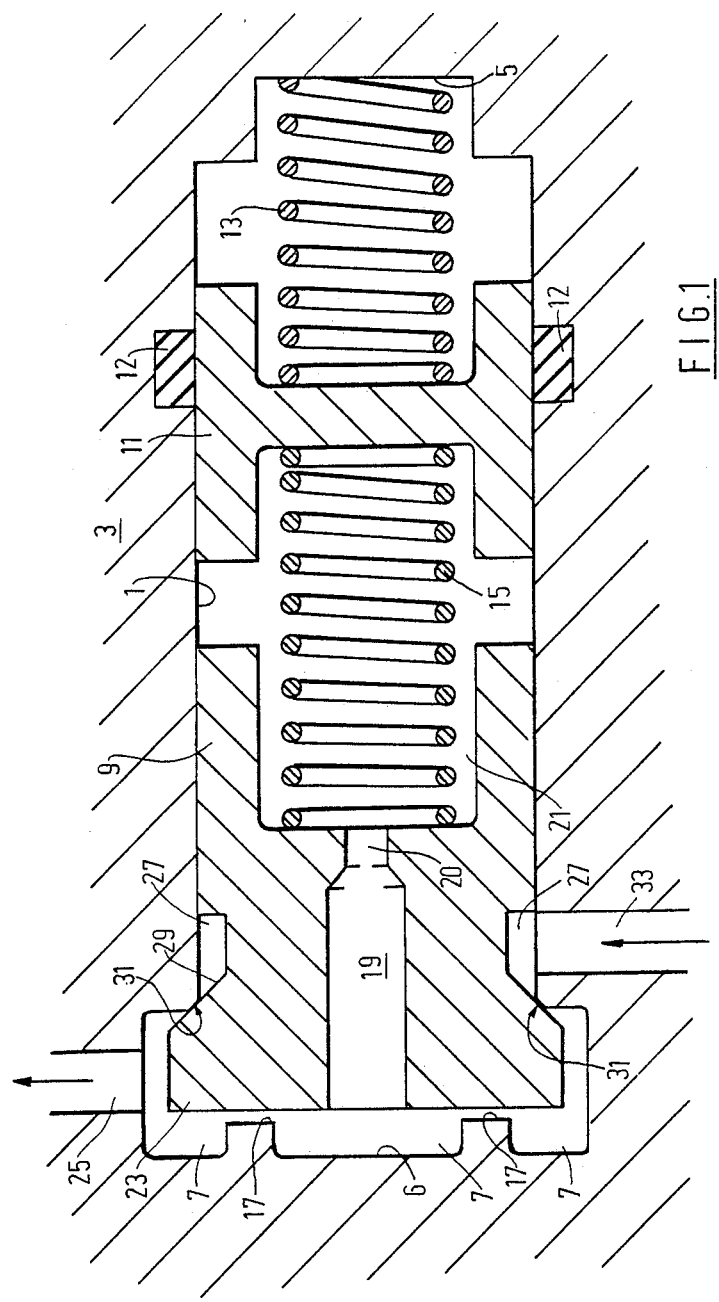
FIG. 1 is a schematic axial cross-sectional view through one embodiment of the present invention.

The deceleration controller schematically illustrated in FIG. 1 of the accompanying drawings, is especially for use with hydraulically applied brakes. The same design can, however, be used with pneumatically applied brakes The controller comprises a cylindrical bore 1 formed in a body 3, the cylindrical bore being closed at both ends 5,6 and having a uniform diameter for the majority of its length, an enlarged diameter end region partially defining a pressure chamber 7. A cylindrical valve member 9 and a cylindrical piston 11 are axially slidably located in said cylinder bore 1, with a main spring 13 located between the piston 11 and one closed end 5 of the bore 1, and a light spring 15 located between the valve member 9 and the piston 11 a seal 12 being provided between the piston 11 and the wall of the bore 1. This spring arrangement 13,15 biases the valve member to a rest position against raised projections 17 formed at the other closed end 6 of the bore 1.

The valve member 9 has a passage 19 incorporating a restrictor orifice 20, extending axially therethrough, said orifice 19 connecting the pressure chamber 7 with the chamber 21 between the valve member 9 and the piston 11. Further, the valve member 9 has an enlarged diameter end region 23 which projects radially into the enlarged diameter pressure chamber 7, an outlet 25 connecting with the brakes, leading from the pressure chamber 7. This enlarged diameter end region 23 forms, together with an annular groove 27 extending circumferentially around the valve member 9, an angled surface 29 which can (as illustrated) engage a knife edge valve seat 31 formed by the shoulder between the uniform diameter portion and the enlarged diameter portion of the bore 1. An inlet 33 connectible to a source of pressurised brake fluid, opens into the annular groove 27 in the valve member 9

In operation with the brakes released, the spring arrangement 13,15 holds the valve member 9 against the projections 17 so that the controller is open, angled surface 29 being spaced from the valve seat 31. When the brake is initially applied, pressurised brake fluid flows from the inlet 33 through the controller to the outlet 25 and the brake. However, the initial flow of pressure fluid through the controller is to take up pad clearance, and whilst this is occurring the fluid pressure in the controller will not rise significantly so there will be no appreciable movement of piston 11 and no significant fluid flow through the passage 19. When the clearance is taken up and the clamp load builds up, the pressure in the chamber 7 will tend to rise rapidly. This pressure rise will also act on the piston 11, causing the piston 11 to move to compress the main spring 13 and attain an equilibrium position. The resulting increase in the volume of chamber 21 causes a rapid fluid flow through the passage 19 which in turn causes a pressure drop across the valve member 9 resulting in the valve member 9 moving to the right in FIG. 1. The angled surface 29 thus approaches the valve seat 31 closing the controller and reducing the rise in pressure in chamber 7. A state of balance is thus achieved when the fluid flow through passage 19 is just sufficient to create a pressure drop across the valve member 9, which pressure drop corresponds to the load in the light spring 15. The resulting movements of the valve member 9 will thus control the pressure rise in the pressure chamber 7 and in the outlet 25. As the static fluid pressure in the outlet 25 is proportional to deceleration and the controller controls the rate of rise in pressure in the outlet 25, when a step rise in pressure is applied at the inlet 33 so the controller controls deceleration irrespective of how rapidly the operator applies the brakes. Thus, the desired deceleration, i.e. jerk rate, can be achieved, this being solely dependent upon the physical design characteristics of the controller as confirmed by the following mathematical analysis:

A = valve/piston area
S = main spring (13) rate
W = light spring (15) load (rate assumed negligible)
K = Orifice constant as defined by $$\frac{dv}{dt} = K\sqrt{P_7 - P_{21}}$$

assuming that the orifice (19) is 'short'
$P_7$ = Pressure in chamber 7
$P_{21}$ = Pressure in chamber 21
V = Volume of chamber 21
dv/dt = rate of change of Volume of chamber 21
$dP_{21}/dt$ = rate of change of Pressure in chamber 21

$$P_7 - P_{21} = \frac{W}{A} \quad (a)$$

$$\frac{dv}{dt} = K\sqrt{P_7 - P_{21}} = K\sqrt{W/A} \quad (b)$$

If pressure in chamber 21 changes by '$P_{21}$', spring load changes by '$P_{21} \times A$'.
The length of main spring 13 will therefore change by $$'l' = \frac{P_{21} \times A}{S}$$

The volume of chamber 21 will therefore change by $$'l \times A' = \frac{P_{21} \times A^2}{S}$$

If all of these changes occur in unit time, then:

$$\frac{dv}{dt} = \frac{d}{dt}\left(P_{21} \times \frac{A^2}{S}\right) = \frac{dP_{21}}{dt} \times \frac{A^2}{S} \quad (c)$$

From equations (b) and (c):

$$\frac{dP_{21}}{dt} = \frac{KS}{A^2}\sqrt{\frac{W}{A}} \quad (d)$$

Since the drop in pressure in the orifice is constant:

$$\frac{dP_7}{dt} = \frac{dP_{21}}{dt} \qquad (e)$$

$$\text{so:-} \frac{dP_7}{dt} = \frac{KS}{A^2} \sqrt{\frac{W}{A}}$$

From equation (e) it is seen that the change in pressure in chamber 7 is purely dependent upon physical design characteristics of the controller. Thus, the controller can be designed to provide the required deceleration.

Another embodiment of the present invention is schematically illustrated in FIG. 2 of the accompanying drawings. Like parts to the components of FIG. 1 are identified by the equivalent reference numeral. However, basically the valve member 9 in FIG. 2 operates in the reverse manner to the valve member 9 of the embodiment of FIG. 1, the embodiment of FIG. 2 being designed for use with spring applied, hydraulically or pneumatically, released brakes. In this embodiment the light spring 15 is located between the valve member 9 and said other closed end 6 of the bore 1. Further, groove 27 in the valve member 9 of FIG. 1 is now replaced by a groove 35 formed in the wall of the bore 1. The balanced condition in the embodiment of FIG. 2, occurs as a result of the falling pressure in the pressure chamber 7, when pressure fluid is flowing out of chamber 21 between the piston 11 and valve member 9, through the passage 19 and into the pressure chamber 7. The light spring 15 ensures that the controller is open in the rest condition.

One of each of the above embodiments can be connected in series to provide for the control of the rate of release of a brake as well as the control of the rate of application; this being desirable to provide for smoother operation in the event of spasmodic or cadence braking. Alternatively, two of either of the above embodiments can be connected in parallel with suitably arranged non-return valves, to produce the desired effect.

A still further embodiment of the present invention is illustrated in FIG. 3 of the accompanying drawings. Again, equivalent parts to the components of the embodiments of FIGS. 1 and 2 are identified by the like reference numeral. However, whilst the embodiments of FIGS. 1 and 2 control the actual application of a braking system in hydraulically/pneumatically applied and hydraulically/pneumatically released systems respectively, the controller of FIG. 3 controls both the rate of application and the rate of release of such brake systems. Thus, besides being suitable for either of the above types of braking system for the control of the brake application, the embodiment of FIG. 3 additionally controls the rate of brake release and thereby provides for smoother operation in the event of spasmodic or cadence type braking. This latter controller comprises a cylindrical valve member 9 which is axially slidable under the effect of fluid pressures, within a cylindrical bore 1 in a body 3, the cylindrical valve member 9 being biassed towards a centralised rest position (illustrated) by a spring 15 which is located over a reduced diameter portion 37 of said cylindrical valve member 9. The spring 15 is located between two annular abutment plates 31,41 which can engage against the respective shoulders 43,45 defining the axial limits of said reduced diameter portion 37. The abutment plates 31,41 also extend radially into an annular groove 47 formed in the wall of the bore 1, the annular groove 47 having a slightly reduced axial dimension as compared to the axial extent of said reduced diameter section 37 of the valve member 9. Thus, whilst the spring 15 presses the abutment plates 31,41 against opposite axial ends of the annular groove 47, the valve member 9 can move axially to a limited degree relative to the abutment plates 31,41 without the spring 15 having to be compressed. Rather than provide the axial clearance 'd' between the abutment plates 31,41 and the axial limits 43,45 of the reduced diameter portion 37 of the valve member 9, the axial dimension of the annular groove 47 can be larger than the axial extent of the reduced diameter portion 37, such that the axial clearance occurs between the abutment plates 31,41 and the axial ends of the groove 47. Alternatively, if desired, the annular groove 47 and reduced diameter portion 37 can have the same axial dimension.

However, the provision of a clearance does have an advantage as is explained later. In this centralised rest position an annular groove 49 formed in the outer surface of the valve member 9, is aligned with a port 51 in the wall of bore 1, this annular groove 49 connecting via radial passages 53 with a passage 19 extending axially right through the valve member 9. The passage 19 has a restrictor orifice 20 formed at one end, said one end being adjacent to a cylindrical piston 11 which is axially slidably and sealingly located in said bore 1. A main spring 13 is arranged between the piston 11 and a closed end 5 of the bore 1. The other end 6 of the bore 1 is, in use, connected via outlet 25, to a brake (not shown) and the port 51 is connected to a supply of pressure fluid.

In a normal continuous braking operation, the controller of FIG. 3 initially remains in the illustrated state whilst pressurised fluid flows through port 51, groove 49, radial passage 53, and passage 19 to the brake. However, when the brake clearance has been taken up and the clamp force increases, the pressure in the bore 1 increases until main spring 13 is compressed by the piston 11 moving under the effect of the pressure fluid. This piston movement causes an initial increase in the volume of the portion of the bore 1 between the valve member 9 and the piston 11, and pressure fluid thus flows along passage 19 and through the restrictor 20 to maintain the said volume full of fluid. The flow of fluid through restrictor 20 causes a pressure drop across the valve member 9, which if sufficiently large, causes the valve member 9 to move towards the piston 11, abutment plate 39 compressing spring 15. This axial valve member movement in one direction moves the groove 49 across port 51 reducing the flow-through cross-section for the pressurised fluid until the fluid flow is just sufficient to produce a pressure drop which balances the load on the spring 15. The resulting movements of the valve member 9 thus control the pressure rise in the bore 1 and in the outlet 25, and thereby control the rate of application of the brake irrespective of how the operator applies the brake.

If during braking the brakes are released and then reapplied, then on release fluid flows into the bore 1 from outlet 25, through the passages 19 and 53, and back to port 51 and the fluid supply. This return flow is accompanied by a drop in fluid pressure in passages 19 and 53. Piston 11 thus moves under the action of spring 13 to reduce the volume of the portion of the bore 1 between the piston 11 and the valve member 9. Pressure fluid is therefore displaced through orifice 20 and passage 19, causing a pressure drop across the valve member 9. If this pressure drop is sufficiently large it will cause the valve member 9 to move away from the piston 11, abutment plate 41 compressing the spring 15. This axial valve member movement in the opposite direction to the valve member movement under brake application, again moves the groove 49 across the port 51 reducing the flow-through cross-section for the pressurised fluid until the fluid flow is just sufficient to produce a pressure drop which balances the load on the spring 15. The resulting movements of the valve member 9 thus control the decrease in pressure in the bore 1 and in the outlet 25, and thereby control the rate of release of the brake irrespective of how the operator releases the brake.

Referring to the clearance 'd' previously mentioned as being advantageously provided to allow for a limited amount of axial movement for the valve member 9 before the spring 15 has to be compressed to allow for further valve movement, both for the control of brake application and brake release, the advantage obtained arises from the fact that this clearance or lost motion 'd' allows the valve member 9 to move smartly to a position appropriate to the flow direction, i.e. dependent upon it being brake application or brake release, before actual throttling of the fluid flow between port 51 and groove 49 occurs. Due to the practical size of port 51 there is a dead stroke of the valve member 9 around the centralised position in which negligible throttling of the fluid flow occurs. By virtue of the clearance 'd' the valve member 9 has, in effect, advance warning of the direction in which it is about to operate. As a result, as soon as the pressure drop across the valve member 9 is sufficient to compress the spring 15, the valve member 9 operates with a better initial response because the necessary movement has been reduced by the amount of the clearance 'd'.

In all of the above described embodiments of the present invention, the passage 19 extends through the valve member 9. However, in an alternative embodiment (not illustrated) passage 19 is replaced by a passage which extends through the body 3 bypassing the valve member 9.

The present invention thus provides a deceleration controller which can be used with hydraulically or pneumatically applied or released brakes, to provide the required 'jerk rate' however rapidly an operator should apply the brakes.

I claim:

1. A deceleration controller comprising a body having therein a chamber in the form of an elongate cylindrical bore of substantially uniform diameter extending through said body, a cylindrical valve member movable in said bore between open and closed position to control fluid flow between an inlet port in the wall of said bore and an outlet port, a piston sealed to the wall of said bore and defining a volume chamber between said valve member and said piston, a passage extending axially through said valve member to connect that part of said bore containing the outlet port with said volume chamber, a main spring located between one axial end of said chamber and said piston, said cylindrical valve member having a reduced diameter region over which a spring is located together with two annular abutment plates, said spring being arranged between said abutment plates to bias said abutment plates apart, said abutment plates extending radially into an annular groove formed in the wall of said bore, whereby the spring biases the valve member towards an axial position in said bore, said inlet port communicating with a radial passage in the valve member, which radial passage connects with said passage which extends axially through the valve member.

2. A controller according to claim 1, wherein said passage extending axially through said valve member incorporates a restrictor.

3. A controller according to claim 1, wherein said outlet port is provided in the region of the other axial end of the bore.

* * * * *